United States Patent [19]

Camosso

[11] 3,789,624
[45] Feb. 5, 1974

[54] HOMOKINETIC JOINTS

[75] Inventor: Domenico Camosso, Turin, Italy

[73] Assignee: Riv-Skf Officine Di Villar Perosa S.p.A., Turin, Italy

[22] Filed: Mar. 15, 1972

[21] Appl. No.: 234,753

[30] Foreign Application Priority Data
Apr. 23, 1971 Italy................................ 68357/71

[52] U.S. Cl............................. 64/21, 64/9 A, 64/8
[51] Int. Cl................................................ F16d 3/30
[58] Field of Search...................... 64/21, 9 A, 8, 9 R

[56] References Cited
UNITED STATES PATENTS

| | | | |
|---|---|---|---|
| 1,524,161 | 1/1925 | Weiss | 64/21 |
| 2,099,848 | 11/1937 | Grodhaus | 64/9 A |
| 3,656,318 | 4/1972 | Smith et al | 64/21 |
| 3,668,893 | 6/1972 | Schmid | 64/21 |

FOREIGN PATENTS OR APPLICATIONS

| | | | |
|---|---|---|---|
| 978,230 | 12/1963 | Great Britain | 64/21 |

Primary Examiner—Charles J. Myhre
Assistant Examiner—Randall Heald
Attorney, Agent, or Firm—Sughrue, Rothwell, Mion, Zinn and Macpeak

[57] ABSTRACT

A homokinetic or constant velocity coupling joint having an outer member having a spherical inner surface, an inner member having a spherical outer surface, and a cage locating a plurality of rolling elements between the inner and outer elements. The inner member has a number of longitudinal tracks for the rolling elements and the tracks are shaped so that when a torque tending to rotate the inner member with respect to the outer member is applied the rolling elements are caused to rock across the tracks and to jam against the outer member, the inner surface of which is completely smooth with no tracks, to transmit the torque from one member to the other. Either member can be the driving member.

10 Claims, 7 Drawing Figures

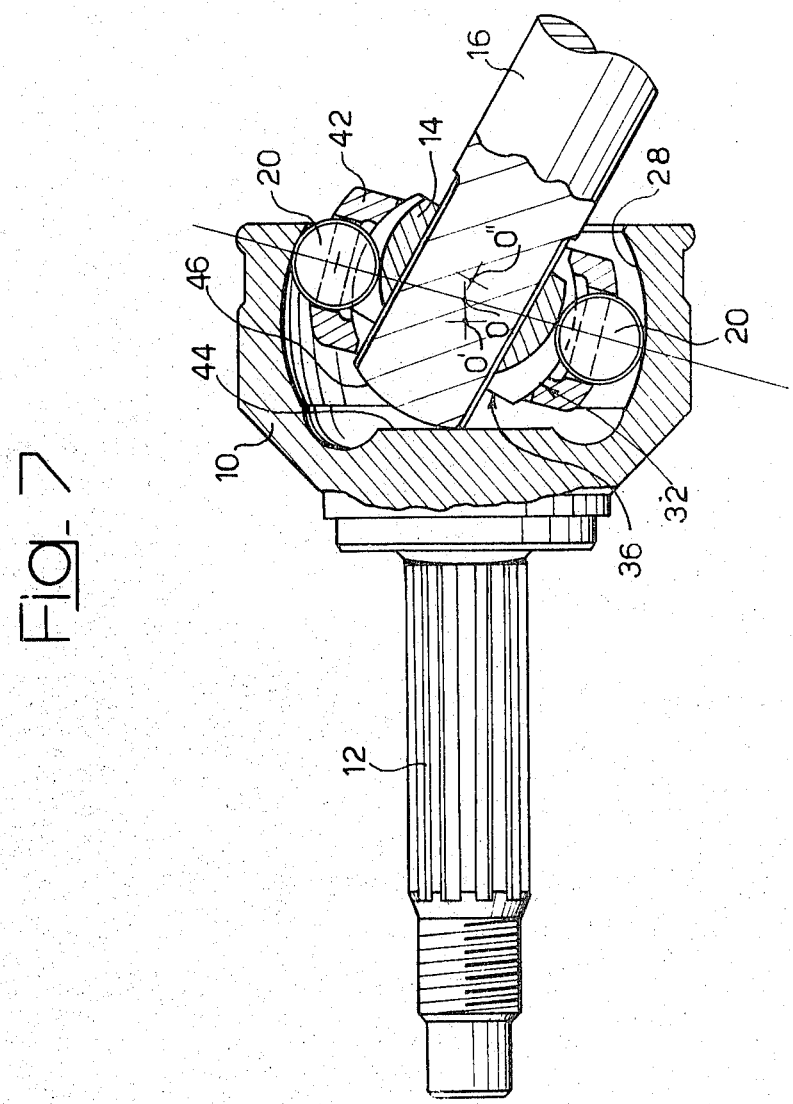

HOMOKINETIC JOINTS

BACKGROUND OF THE INVENTION

The present invention relates to homokinetic joints comprising an inner member and an outer member having generally spherical outer and inner surfaces respectively, each member being connected to a respective shaft, a cage located between the inner and outer members and a number of rolling elements held in position in the cage. Such joints are widely used in front wheel drive motor vehicles to connect the stub axles of the front steering wheels to the output shaft of the gear box. In such applications they are frequently referred to as constant velocity joints.

One type of homokinetic joint at present in common use is similar to the joint described in U.S. Pat. No. 2,046,584 filed in the name of A. H. Rzeppa. In this joint the rolling elements are spheres which move in tracks formed as recesses extending along longitudinal meridians in the spherical surfaces of the inner and outer members. When used in this Specification the terms longitudinal and transverse will be understood to refer to directions taken with respect to the nominal axis of the joint as a whole; that is, the axis of the joint when the two shafts being coupled are aligned with each other. In most joints of this previously known type the spherical surfaces of the inner and outer members and the cage are all concentric. The centres of curvature of the tracks in the longitudinal direction do not, however, coincide with the centre of curvature of the spherical surfaces of the inner and outer members and the cage and are, on the contrary, displaced with respect to the latter. The centres of curvature of the tracks of the inner and outer members, in fact, lie on the axis of the joint at points equidistant from the centre of these members and situated on respective sides of the centre. This construction and certain other effectively equivalent arrangements serve to ensure that when the axes of the shafts are disposed at an angle to one another the plane containing the centres of the spheres, bisects this angle, since this is the condition necessary for homokinetic transmission of motion by the joint.

Although the previously known joint discussed above may have had some success, it is nevertheless not entirely free from disadvantages. One disadvantage of this joint is the large amount of machine tool work involved in the manufacture of the joint. In particular a large amount of machining work is needed to make the tracks in the spherical surfaces of the inner and outer members and this makes the joints complex and expensive.

Another disadvantage of these joints is the fact that the torque which the joint is capable of transmitting is limited by the relatively small area of contact between the spherical rolling elements and the tracks. This disadvantage can be reduced by increasing the dimensions of the spherical rolling elements but this can only be done at the expense of an increase in the size of the joint.

OBJECTS OF THE INVENTION

One object of the present invention is to provide a homokinetic joint of improved type in which the above-mentioned disadvantages are reduced.

Another object of the present invention is to provide a joint in which at least in some embodiments the rolling elements are such that the torque which the joint can transmit is substantially greater than that which can be transmitted by known homokinetic joints without any increase in the dimensions of the joint itself.

SUMMARY OF THE INVENTION

According to the present invention there is provided a homokinetic joint for connecting two shafts, comprising an inner member and an outer member each of which has means for connecting the member to a respective shaft, a cage between the inner and outer members for locating a plurality of rolling elements which are in contact with the inner and outer surfaces of the outer and inner members respectively, the rolling elements lying in a plane bisecting the angle between the shafts, the inner member having a number of longitudinal recesses each of which forms a track for one of the rolling elements, characterised in that the inner surface of the outer member which is in contact with the rolling element, is substantially spherical and smooth.

Embodiments of this invention can thus be manufactured without the necessity of providing recesses for tracks for the rolling elements.

In a preferred embodiment of the invention the rolling elements are barrel rollers. Particularly good results are obtained when the transverse radius of curvature of the barrel rollers is approximately, but not exactly, the same as that of the spherical surfaces of the inner element. A preferred ratio for these radii lies between 0.95 and 0.98.

Various other features and advantages will become more apparent from a consideration of the following more detailed description which is given merely by way of example.

BRIEF DESCRIPTION OF THE DRAWINGS

FIG. 7 is a longitudinal section of a second embodiment of the invention.

DESCRIPTION OF THE PREFERRED EMBODIMENTS

Figure 1:
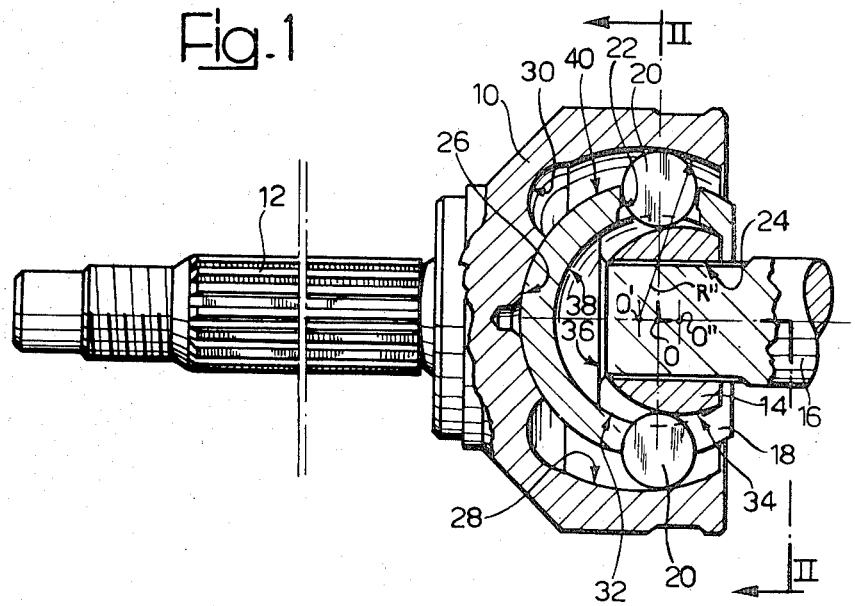
FIG. 1 is a longitudinal section of a homokinetic joint constructed as an embodiment of this invention.

The homokinetic joint shown in FIGS. 1 to 6 comprises an outer cup-shaped member 10 having a splined stub shaft 12 to which a complementarily splined shaft can be connected, an inner member 14 having an axial splined bore 24 receiving a complementarily splined shaft 16, a cage 18 and six barrel rollers 20 located in apertures 22 of the cage. The inner surface of the outer member 10 can be considered in three separate parts, a first spherical surface portion 26, the centre of which lies at the point 0, adjacent the closed end from which the shaft 12 projects, a second smooth spherical surface portion 28 of radius R'' with its centre at 0' on the axis of the element 10 and spaced from the centre 0 towards the closed end of the element 10, the surface portions 26 and 28 being linked together by an annular concave surface portion 30.

Figure 6:
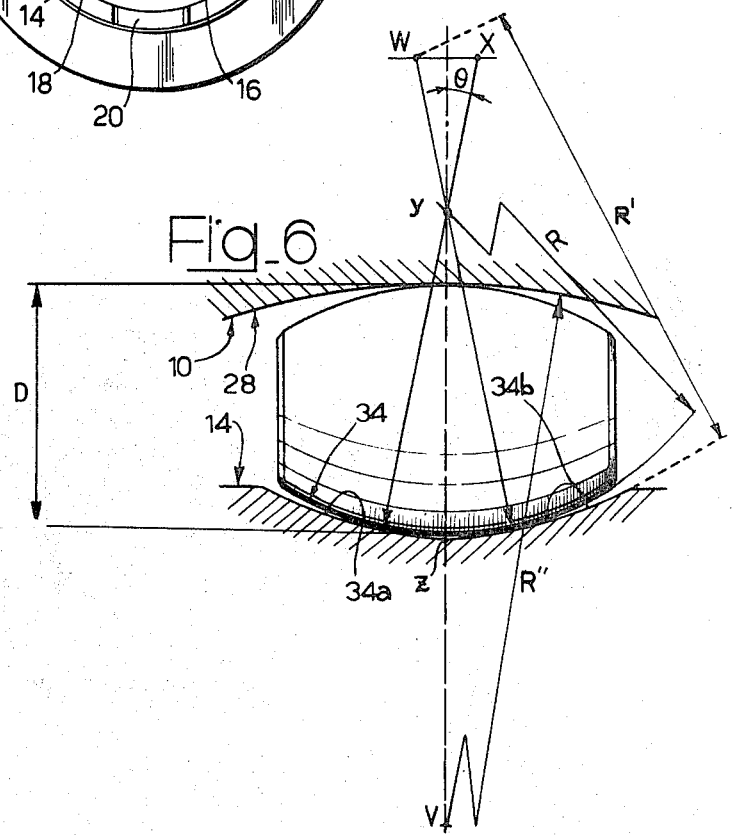
FIG. 6 is a view on an enlarged scale of a barrel roller of the embodiment of FIGS. 1 to 5, which illustrates the relation between the curvature of the roller, the curvature of the track of the inner member, and the curvature of the spherical inner surface of the outer member.
Figure 4:
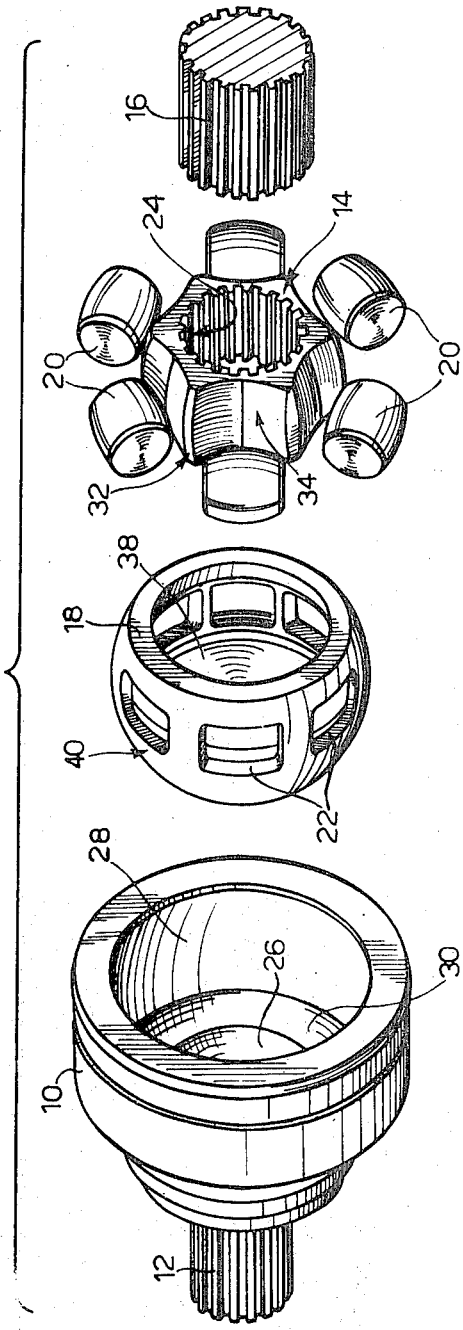
FIG. 4 is an exploded perspective view of the embodiment of FIGS. 1 to 3.

The internal element 14 has an outer spherical surface 32 the centre of which, when the joint is assembled, lies at the point 0, and is therefore concentric with the inner surface portion 26 of the outer member 10. In the outer surface of the inner member 14 there are formed six recesses or tracks 34 extending substantially parallel to the axis of the bore 24. The tracks have a double curvature; the transverse curve is shown in FIG. 6, in which the differences of curvature between the various components are greatly exaggerated for the sake of clarity. The transverse curvature of each track 34 consists of two parts 34a, 34b of equal radius, which meet at a cusp at a point z on the centre line of the track. The surface of the track at the locus of the point z is spaced from any roller 20 located in the track and the locus of the point z follows the longitudinal centre line of the track 34.

With particular reference to FIG. 6, the centre of curvature of the transverse curve of the rollers is indicated by Y. This centre lies in a meridian plane containing the locus of the point z. The transverse radius of curvature of the roller 20 is indicated by R. The radius of curvature of the parts 34a and 34b of the track is R. The centre of curvature of the part 34a of the track is situated at a point X which is on the opposite side of the above mentioned meridian plane from the part 34a of the track. Similarly, the centre of curvature W of the part 34b of the track is located on the side of this meridian plane opposite to that of the part 34b of the track. The lines XY, WY each form an angle $\theta$ with the extension of the line zY and thus with the above mentioned meridian plane of the member 14. The angle $\theta$ is less than the angle of friction between the roller 20 and the inner member 14, and the value of $\theta$ in general, is equal to or less than 6°. The ratio R/R' between the transverse radius of curvature of the rollers 20, and the transverse radius of curvature of the parts 34a and 34b of the track preferably lies between 0.95 and 0.98.

The centre of curvature of the spherical inner surface 28 of the outer member 10 is located at V: the transverse radius of curvature R'' of this surface is preferably equal to the radius R' of the curvature of the track parts 34a, 34b so that the ratio between the transverse radius of curvature of the rollers 20 and the transverse radius of curvature of the inner curved surface of the outer member, R/R'' also lies between 0.95 and 0.98.

The track 34 has a longitudinal centre of curvature at 0'', (see particularly FIGS. 1 and 3) which is situated on the axis of the inner member 14 and spaced from one side of the centre 0 of the surface portion 26 by the same amount as the centre 0' of the spherical surface portion 28 is spaced on the opposite side when the shafts 12 and 16, and thus the centres 0, 0' and 0'' are aligned as shown in FIG. 1. The inner member 14 has a flat face 36 adjacent to the end of the shaft 16.

Since the radius of curvature R of the rollers 20 is very similar to the radius R' of the parts 34a and 34b of the track and also the radius R'' of the spherical surface portion 28 of the outer member 10, the surfaces of the rollers 20, when assembled in the joint, form relatively large areas of contact with the spherical surface portion 28 of the outer member 10 and with the surface of the tracks 34 of the inner member 14. In fact, the area of contact is, in practice, considerably greater than that which is obtainable with spheres of diameter D (which, as shown in FIG. 6, is the maximum diameter of the rollers 20) in previously known joints, with a circular transverse profile in which both the inner and outer members have tracks for the rolling elements. Consequently, the torque which joints constructed as embodiments of this invention are able to transmit is much greater than that which can be transmitted by known joints of the same or equivalent size.

The cage 18 has inner and outer spherical surfaces 38 and 40 which are centred on the point 0 so that the cage is therefore concentric with the outer surface 32 of the inner member 14 and with the surface portions 26 of the outer member 10. The cage 18 is not annular but is cup-shaped and its thickness is such that its outer surface 40 fits closely (apart from a small amount of play, necessary for operation), with the surface portion 26 of the outer member 10. Similarly, the inner surface 38 of the cage 18 fits closely to the outer spherical surface 32 of the inner member 14 so that the cage slides over these surfaces when the joint is in use. The rollers 20 are mounted in the cage with their axes in a common plane which bisects the angle between the shafts 12 and 16. In FIG. 1 this plane is normal to the axes of these shafts since they are parallel to one another.

Figure 3:
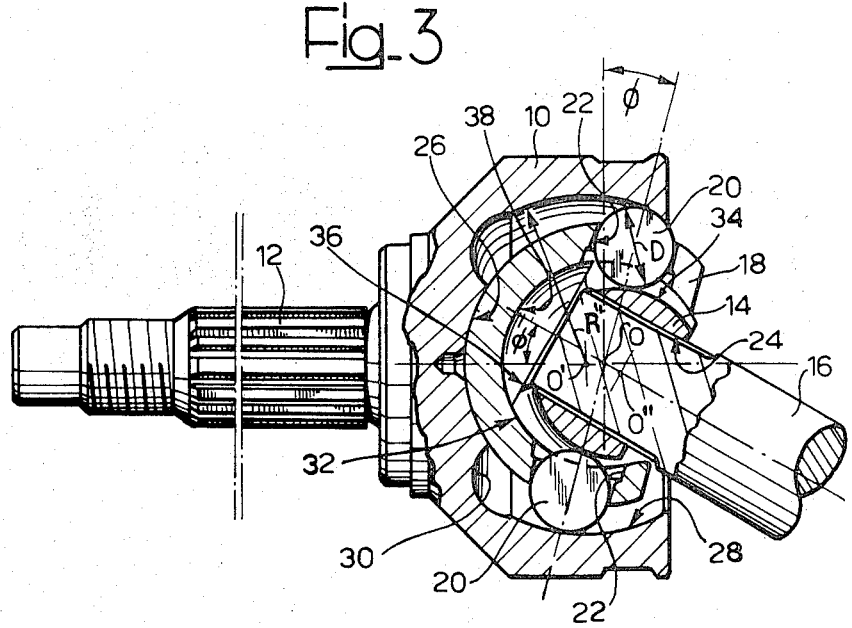
FIG. 3 is a cross section similar to FIG. 1, but in which the shafts connected to the joint, are shown at a slight angle to one another.
Figure 2:
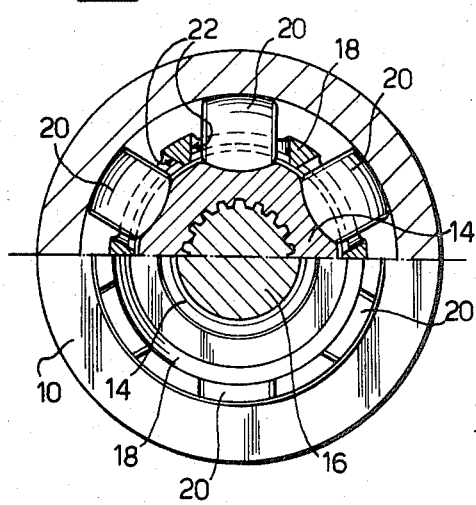
FIG. 2 is a transverse section of the embodiment of FIG. 1 taken on the line II—II of FIG. 1.
Figure 5:
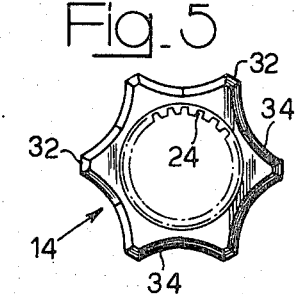
FIG. 5 is a front view of the inner member of the embodiment shown in FIGS. 1 to 3.

As in known homokinetic joints, when the shafts 12 and 16 become angularly disposed with respect to one another, say by an angle $\phi$ as shown in FIG. 3, the cage 18 rotates by an angle $\phi'$ the value of which is substantially equal to half the angle $\phi$. The rollers 20 rotate about their axes between the surfaces 34 and 28, maintaining large areas of contact with both these surfaces, in order to effect this movement of the cage 18.

The torque is transmitted from the driving shaft to the driven shaft by means of the rollers 20 which behave as jamming cams. The torque on the driving shaft tends to cause rotation of the rollers 20 about an axis parallel to the axis of the bore 24 in the inner member 14 so that they tend to rotate towards one side or the other of their tracks in the inner member 14. This inclination produces a true and correct jamming in the respective positions, impeding the relative rotation of the inner and outer members 10 and 14.

It will be noted that the space between the inner curved surface portion 28 of the outer member and the outer curved surface 32 of the inner member 14 widens towards the closed end of the outer member 10, and that surface 40 of the cage 18 is spaced from the surface portion 28 of the outer member 10. Thus, any axial forces which would tend to separate the shafts 12 and 16 do not tend to crush the cage directly between the inner and outer members as was the case in prior homokinetic joints. In this embodiment such axial forces are transmitted to the rollers 20 which tend to be wedged toward the closed end of the outer member by the forces exerted between the inner and outer member and to transmit axial forces in this direction to the apertures of the cage 18, which abuts the surface portion 26 of the outer member to resist relative axial movement of the inner and outer members.

Axial forces in the other direction, which would tend to push the shafts towards each other, are resisted directly by the abutment of the cage 18 against the spherical surface portion 26 of the outer member 10.

In the embodiment shown in FIG. 7 like components are indicated by the same reference numerals as those used for the embodiment described above with reference to FIGS. 1 to 6. The differences between the two embodiments lies in the fact that the cage 42 of the embodiment of FIG. 7 is not cup-shaped, but annular, and that the spherical surface portion 26 of the outer member 10 of the previous embodiment is replaced in this embodiment by a flat surface 44. The end of the shaft 16 which projects through the inner member 14 has a spherically curved end 46, centred at 0, which abuts against the flat surface 44. This contact ensures that the inner and outer members remain concentric, despite changes of the angle between the two shafts.

In the embodiment of FIG. 7 axial forces on the shafts which would tend to push them towards each other, are opposed by the contact of the spherical end surface 46 of the shaft 16 and the flat surface portion 44 of the outer member 10.

In the embodiment described above, since the surfaces of the outer member 10 which are engaged by the rollers 20 is smooth and spherical it is possible to avoid machine tool work on tracks of special form such as was required in previously known homokinetic joints. This entails a substantial saving in production costs. Moreover, the area of contact between the barrel rollers and the spherical surfaces of the inner and outer members is considerably greater than the corresponding areas of contact in known homokinetic joints so that the torque which can safely be transmitted by a joint constructed as an embodiment of this invention is greater than that which could be transmitted by previously known homokinetic joints of the same size.

It will be appreciated that the embodiments described and illustrated may be modified in various ways, for example, the barrel rollers could be replaced by the more usual balls. This variation however would have the disadvantage that the area of contact between the balls and the outer member of the joint would be reduced, thus reducing the torque which can be transmitted by the joint.

We claim:

1. A homokinetic joint for coupling two shafts, said joint comprising,
    an inner member said inner member having means for connecting the member to one of said two shafts,
    an outer member, said outer member having means for coupling said member to the other of said two shafts,
    a cage between said inner and outer members, said cage having a plurality of apertures therein,
    a plurality of barrel-shape rolling elements located in respective said apertures in said cage, said rolling elements contacting both the inner surface of said outer member and the outer surface of said inner member, the axes of said barrel-shape rolling elements all lying in a plane which bisects the angle between said two shafts,
    a plurality of longitudinal recesses in said inner member, said longitudinal recesses forming tracks for respective said rolling elements, that part of the inner surface of said outer member which is in contact with said rolling elements being substantially spherical and smooth.

2. The homokinetic joint of claim 1 wherein the ratio between the transverse radius of curvature of said barrel-shape rolling elements and the transverse radius of curvature of said spherical inner surface of said outer member lies in the range between 0.95 and 0.98.

3. The homokinetic joint of claim 1 wherein the surfaces of said recesses in said inner member are curved in cross section, said curve having two parts of equal radius which meet at the centre line of said track in a cusp which is spaced from said rolling element on said track.

4. The homokinetic joint of claim 3 wherein said radii of curvature of said two curved parts of said track are substantially equal to the radius of curvature of said spherical portion of said inner surface of said outer member.

5. The homokinetic joint of claim 3 wherein the centre of curvature of each of said two curved parts of said track lies on the opposite side of a meridian plane containing said cusp from said curved part, and a line joining each said centre of curvature to the centre of transverse curvature of said rolling element in contact with said recess forms with said meridian plane an oblique angle not greater than the angle of friction between said rolling element and said inner member.

6. The homokinetic joint of claim 5 wherein said oblique angles between said lines joining said transverse centre of curvature of each of said two curved parts of said tracks and said transverse centre of curvature of said rolling element in contact with said recess is less than or equal to 6°.

7. The homokinetic joint of claim 1 wherein said outer and inner members have substantially concentric surfaces with which sliding contact is made by respective surfaces of said cage, said cage and said outer member being cup-shaped and said members contacting at a single region corresponding to the bases of said cups.

8. The homkinetic joint of claim 1 wherein said outer member is cup-shaped, the inner surface of the base of said cup being flat and cooperating with the end of a shaft which is connected to and passes through said inner member, said shaft having a substantially spherical end which abuts said flat inner surface.

9. The homokinetic joint of claim 7 wherein said inner and outer members are shaped such that the facing surfaces thereof are separated by a greater distance at the closed end of said outer member than at the open end of said outer member.

10. The homokinetic joint of claim 8 wherein said inner and outer members are shaped such that the facing surfaces thereof are separated by a greater distance at the closed end of said outer member than at the open end of said outer member.

* * * * *